US006981346B1

(12) United States Patent
Wiezycki

(10) Patent No.: US 6,981,346 B1
(45) Date of Patent: Jan. 3, 2006

(54) ICE FISHING HOLE STRAINER DEVICE

(76) Inventor: Donald D. Wiezycki, 20033 Wild Rice Dr., East Bethel, MN (US) 55092

( * ) Notice: Subject to any disclaimer, the term of this patent is extended or adjusted under 35 U.S.C. 154(b) by 0 days.

(21) Appl. No.: 10/879,930

(22) Filed: Jun. 28, 2004

Related U.S. Application Data

(60) Provisional application No. 60/493,712, filed on Aug. 7, 2003.

(51) Int. Cl.
*A01K 97/01* (2006.01)

(52) U.S. Cl. ........................................................ 43/4

(58) Field of Classification Search ..................... 43/4; 294/55, 53.5, 19.2, 19.1, 1.4; 210/470, 464, 210/465
See application file for complete search history.

(56) References Cited

U.S. PATENT DOCUMENTS

| | | | | |
|---|---|---|---|---|
| 1,066,788 | A * | 7/1913 | Bowen | 210/464 |
| 3,846,320 | A * | 11/1974 | Edwards | 210/471 |
| 4,446,646 | A * | 5/1984 | van't Veld | 43/12 |
| 6,694,662 | B1 * | 2/2004 | McClure | 43/4 |

* cited by examiner

*Primary Examiner*—T. Nguyen
(74) *Attorney, Agent, or Firm*—Anthony G. Eggink; Katrina M. Eggink

(57) ABSTRACT

An ice fishing hole strainer device for capturing and removing ice particles from a newly drilled ice hole. The ice fishing hole strainer device comprises an elongated handle attached to a cylinder with a hinged circular bottom having a plurality of holes. A stop ring and slotted hinge structure cooperate to pivot, open and close the apertured circular bottom in the cylinder as the strainer device is lowered into and raised from the ice hole to remove ice particles therefrom.

18 Claims, 4 Drawing Sheets

ICE FISHING HOLE STRAINER DEVICE

BACKGROUND OF THE INVENTION

This application claims the benefit of U.S. Provisional Application No. 60/493,712, filed on Aug. 7, 2003.

This invention relates generally to a device for preparing the hole in the ice for ice fishing. Particularly, this invention relates to an ice fishing hole strainer device for removing ice particles from the ice hole after the hole has been drilled through the ice.

When ice fishing, the fisherman initially drills a hole, i.e., 8 or 10 inches in diameter, through the ice. The hole may be drilled by means of a powered auger. Subsequent drilling, the hole is typically filled with ice chips and ice particles which need to be removed from the ice hole so that the fisherman can proceed with his fishing sport.

In the past various cup, scoop and dipping devices have been utilized for the purpose of cleaning the ice hole, however, the use of these prior art devices has been found time consuming, difficult and cumbersome. The ice fishing hole strainer device of the present invention provides an effective device which overcomes the shortcomings and limitations of the prior art devices. The ice fishing hole strainer device of the invention provides a quick and effective way to achieve a clean ice hole for ice fishing.

SUMMARY OF THE INVENTION

This invention relates to an ice fishing hole strainer device that is constructed to easily and effectively remove ice particles from a hole after drilling the hole through the ice.

The ice fishing hole strainer device is comprised of a cylindrical member having an open top and an open bottom. The cylindrical member or cylinder has a cooperating round trap door with a plurality of holes. The trap door is attached to the inside of the cylinder by means of a hinge structure. A circular stop member is provided at the bottom inner periphery of the cylinder and which is positioned to cooperate with the hinged trap door. The strainer device further has an elongated handle member attached to the top of the cylinder for operating the ice fishing hole strainer device.

When the strainer device is lowered into the opening in the ice, the trap door pivots upward on the hinge structure and opens, thereby allowing the ice particles to enter the cylinder. When lifted up and out of the opening in the ice the trap door closes, thus trapping the ice particles inside the cylinder while the water drains out of the holes in the trap door. The ice may then be removed by tipping the strainer device upside down.

An advantage of the ice fishing hole strainer device is that the device automatically opens the trap door as the cylinder is lowered through the ice hole and the trap door automatically closes to trap the ice particles as the strainer device is lifted upward through the ice hole.

The ice fishing hole strainer device provides further novel features which cooperate to yield an effective and efficient assembly to provide a clean ice hole for ice fishing with minimal effort.

These and other benefits of this invention will become apparent from the following description by reference to the drawings.

DESCRIPTION OF THE PREFERRED EMBODIMENTS

This invention relates to an ice fishing hole strainer device that is constructed and arranged to remove ice particles from an ice hole after drilling the hole through the ice.

Figure 1:
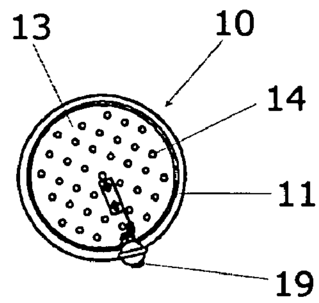
FIG. 1 is a top plan view of the ice fishing hole strainer device of the invention.
Figure 2:
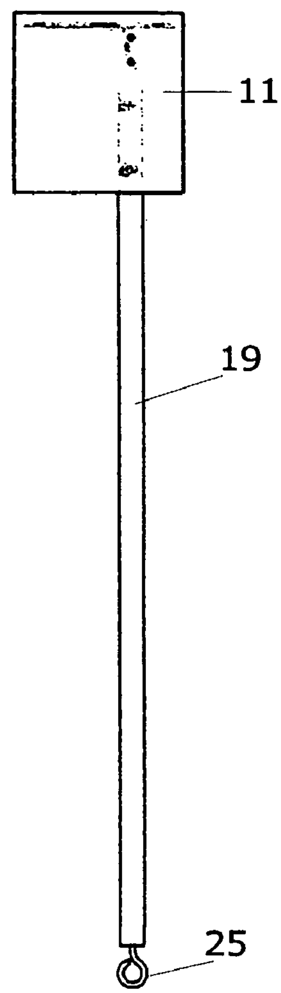
FIG. 2 is a lateral elevational view showing one side of the device.
Figure 3:
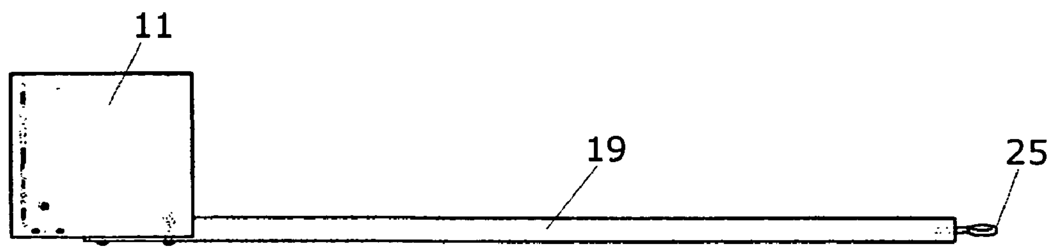
FIG. 3 is a lateral elevational view showing the opposite side of the device.

Referring to FIGS. 1–3, the ice fishing hole strainer device 10 is shown comprised of a cylinder 11 having an apertured strainer or trap door 13 with a plurality of holes 14. The cylinder 11 is connected at one end to an elongated handle member 19 having an eye bolt 25 at the opposite end for storage purposes.

Figure 5:
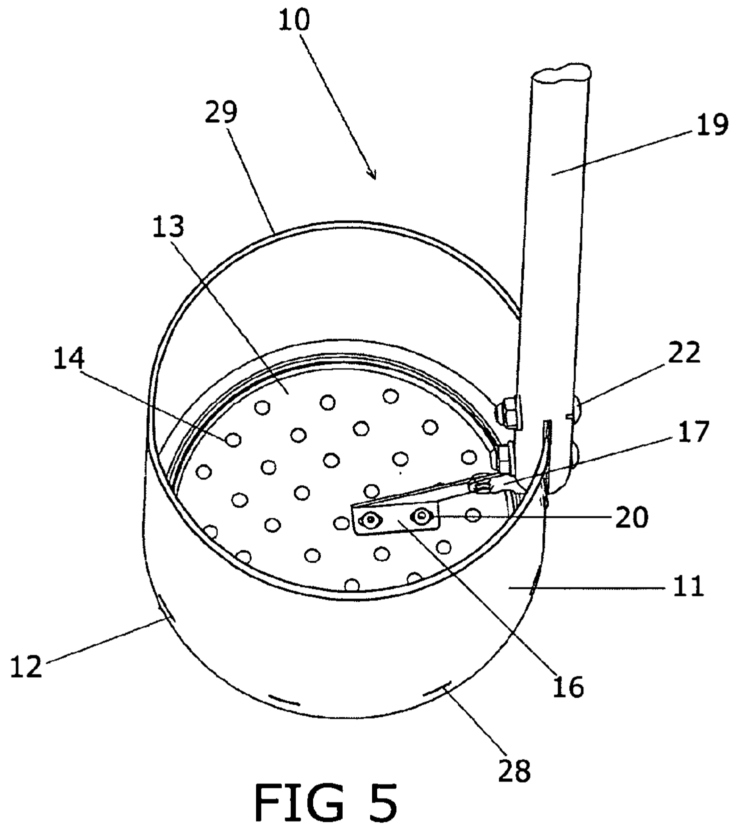
FIG. 5 is a perspective view of the invention and showing the device in a closed position.
Figure 6:
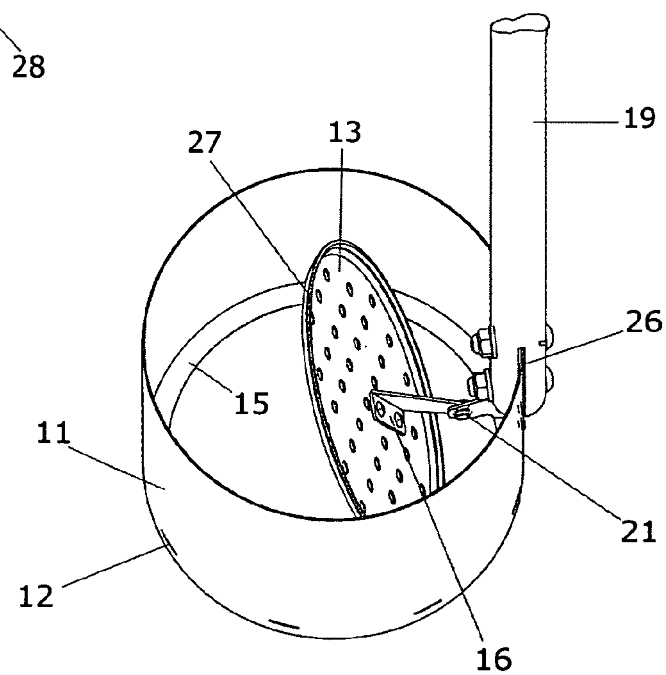
FIG. 6 is a perspective view of the invention and showing the device in an open position.

FIGS. 5 and 6 show the ice fishing hole strainer 10 wherein the strainer or trap door 13 with apertures 14 is in a closed position (FIG. 5) and in an open position (FIG. 6). A hinge structure is shown comprised of a lower hinge portion 16, an upper hinge portion 17 and a hinge connecting or pivot member 21. The hinge structure is shown pivotally connecting the trap door 13 to the inside of the cylinder 11. When the device 10 is lowered into the ice hole, the trap door 13 is automatically opened (FIG. 6) and when pulled upward the hinged door 13 is automatically closed (FIG. 5) to thereby trap the ice particles within the cylinder 11 for removal from the ice hole. As shown in FIG. 5, an edge strip 29 may be positioned over the upper edge of the cylinder 11. The edge strip 29 is a protective strip which may be formed of a plastic composition or the like.

Figure 4:
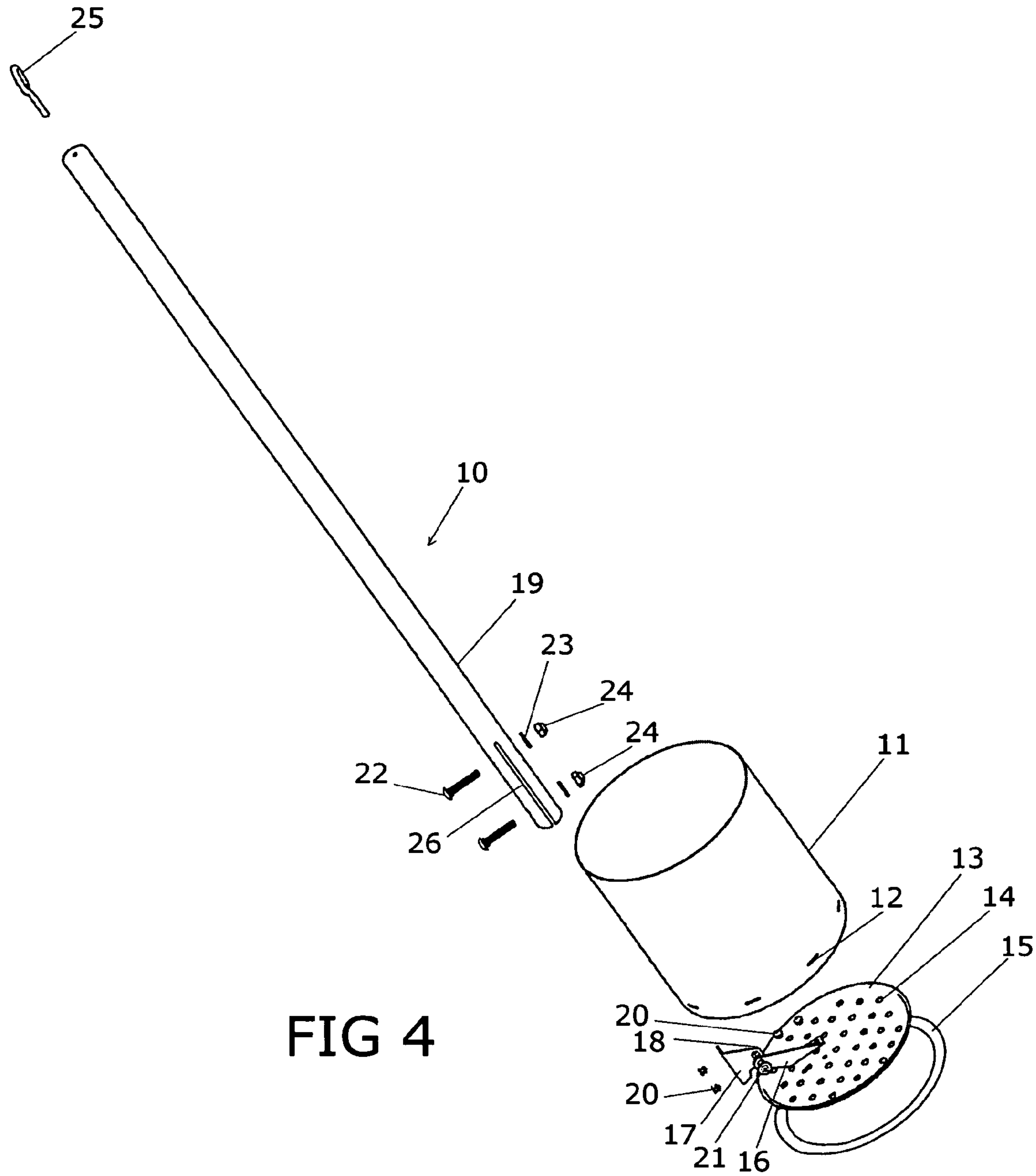
FIG. 4 is an exploded view showing the various elements of the device of the invention.

Referring particularly to FIG. 4, the ice fishing hole strainer device 10 is shown in a separated state to thereby show the various elements comprising the device. The strainer device 10 is shown comprised of a cylindrical body 11 having a plurality of slots 12 about its lower periphery. The slots 12 may be utilized to secure a stop ring 15 at the bottom of the cylinder 11, i.e., tabs 28 extending from the stop ring 15 periphery may be secured within matching and aligned slots 12 of the cylinder 11, for example.

Importantly, a hinged trap door 13 having a plurality of apertures 14 is secured within cylinder 11. For example, hinge portion 16 is shown positioned for securement to the trap door or strainer 13 by means of fasteners 20, i.e., rivets, for example, and hinge portion 17 is shown positioned for securement to the interior wall of the cylinder 11 by means of fasteners 20, i.e., rivets, for example. Connecting member 21, i.e. a shoulder rivet, connects the hinge portion 16 and hinge portion 17.

The hinge member 17 preferably has an elongated slot 18 through which connecting member 21 extends. The elongated slot 18 in the hinge member 17 allows the hinge 16 and the trap door 13 additional movement so that the beveled edge 27 of the circular trap door 13 can be positioned with respect to and onto the stop ring 15 when the trap door 13 is operated and closed. Connecting member 21 extends through the elongated slot 18 of hinge portion 17 but allows the hinge members 16 and 17 to move vertically with respect to each other.

An elongated handle 19 is shown positioned for connection to the top of cylinder 11 by means of slot 26 in the bottom of handle 19 and fasteners 22, i.e., carriage bolts with washers 23 and lock nuts 24, which connect the bottom of handle member 19 to the cylinder 11. At the top of handle 19 an eyebolt 25 may be provided for purposes of hanging storage of the strainer device 10.

Figure 7:
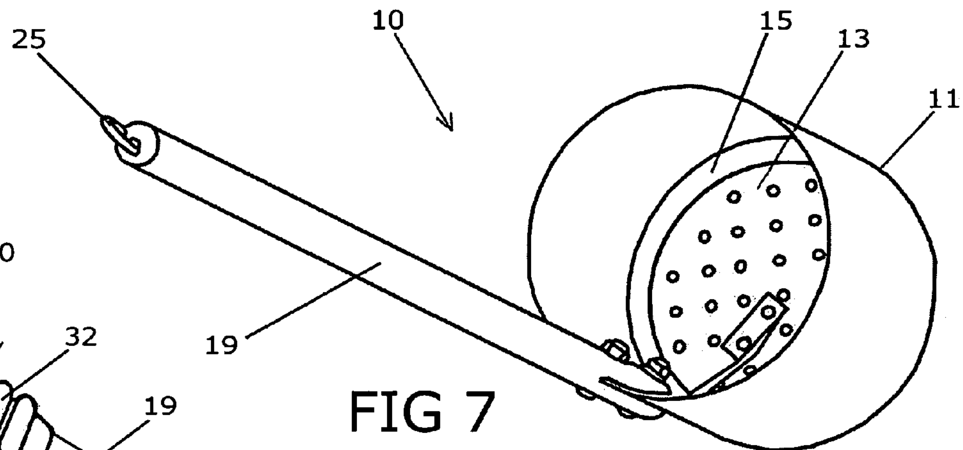
FIG. 7 is a perspective view showing the ice fishing hole strainer device in a closed position.
Figure 8:
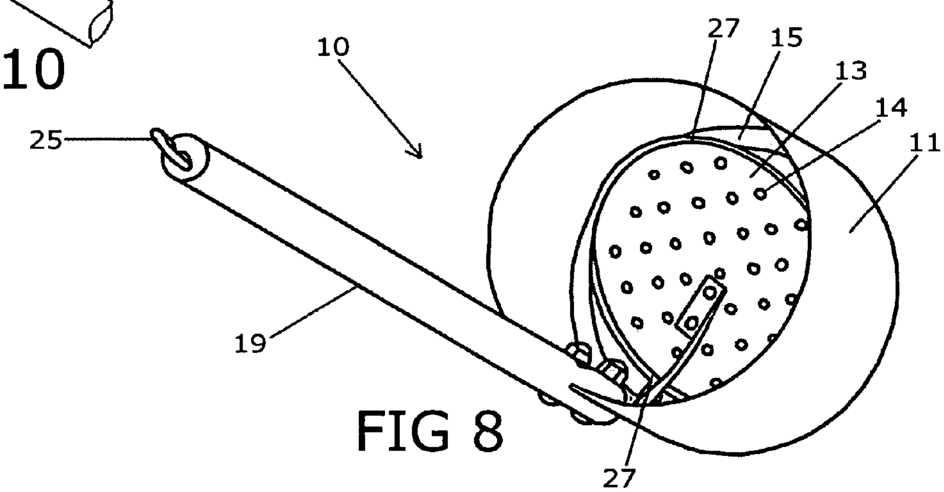
FIG. 8 is a perspective view showing the ice fishing hole strainer device in a partially opened position.
Figure 9:
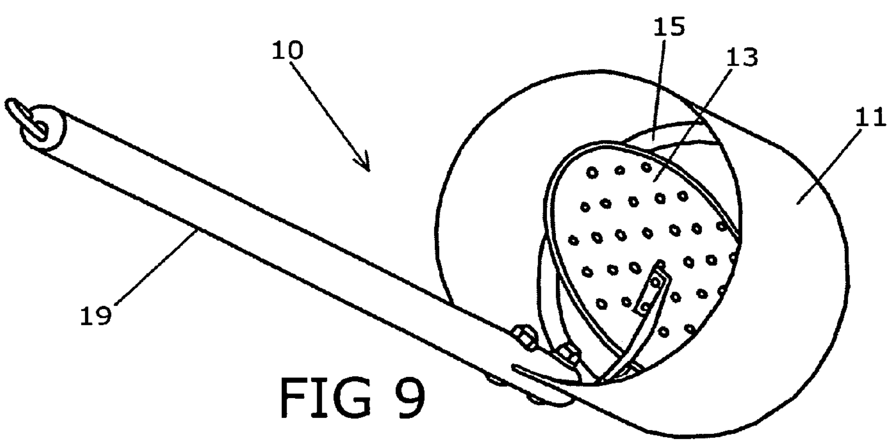
FIG. 9 is a perspective view showing the ice fishing hole strainer device in an open position.

FIGS. 7, 8 and 9 further show the ice fishing hole strainer device 10 in various positions of use; FIG. 7 shows the strainer device 10 in a closed position, FIG. 8 in a partially opened position and in FIG. 9 in a fully opened position.

Figure 10:
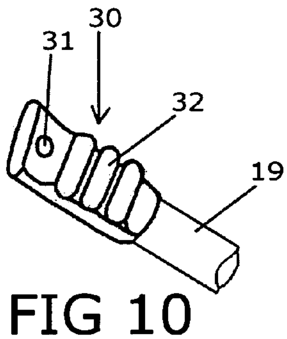
FIG. 10 is a perspective view showing a handle grip used on the handle member of the strainer device.

FIG. 10 shows a handle grip member 30 which may be utilized on the elongated handle member 19. The handle grip 30 may be formed of a polymeric or rubber material and frictionally fit onto the end of the handle member 19. The handle grip 30 has an aperture 31 at the top for hanging or storage purposes and has a plurality of formed grip portions 32 designed to facilitate the hand grip of the user.

The cylinder 11 may be constructed of galvanized steel or like material to form a 7 or 9 inch diameter cylindrical structure, for example for use in 8 or 10 inch diameter ice holes, which are typically utilized. The cylinder 11 may be formed of a sheet of material, metallic, plastic, or other rigid material which may be formed into a cylindrical structure. The slots 22 in the bottom of cylinder 11 may be aligned with the peripheral tabs 28 of the stop ring 15 to thereby form the cylindrical portion of the device 10. The trap door 13 may also be formed of a metallic structure or like material. The elongated handle member 19 may be constructed of wood or other suitable composition and has any desired length so as to permit the user to plunge the cylinder into the ice hole for ice particle removal.

In summary, the ice fishing hole strainer device 10 is shown comprised of a cylinder which has a round trap door with holes attached to the cylinder by means of a hinge structure. When the device is lowered into the opening in the ice, the trap door opens, allowing the ice to enter the cylinder. When lifted up and out of the opening the trap door closes, thus trapping the ice particles while the water drains out of the holes in the trap door. The ice may then be removed by tipping the device upside down.

As many changes are possible to the ice fishing hole strainer embodiments of this invention, utilizing the teachings thereof, the description above and the accompanying drawings should be interpreted in the illustrative and not in the limited sense.

That which is claimed is:

1. An ice fishing hole strainer device for capturing and removing ice particles from a newly drilled ice hole comprising a) a generally cylindrical structure having a wall, a top end and a bottom end;

b) a stop ring having a periphery and an inside diameter, wherein said periphery of said stop ring mounted at said bottom end within said cylindrical structure;

c) a freely movable, generally circular bottom member having a plurality of apertures therethrough, said circular bottom member having a diameter greater than said inside diameter of said stop ring and being positioned in said cylindrical structure to abut said stop ring;

d) a slotted hinge structure having a first connecting portion and a second connecting portion and an interconnection pivot member, said first connecting portion having a slot and being mounted to the interior of said wall and said second connecting member mounted to said generally circular bottom member said pivot member connecting said first and second connecting portions to permit pivotal and vertical movement; and e) an elongated handle member attached to said top end of said wall of said generally cylindrical structure and extending upward and generally parallel to said wall, said stop ring and said slotted hinge structure cooperate to pivot, open and close said generally circular bottom member within said cylindrical structure as said strainer device is lowered into and raised from the ice hole to remove ice particles therefrom.

2. The ice fishing hole strainer device of claim 1, wherein a peripheral protective edge strip is positioned on the top end of said cylindrical structure.

3. The ice fishing hole strainer device of claim 1, wherein said cylindrical structure is formed of a galvanized steel or plastic composition.

4. The ice fishing hole strainer device of claim 1, wherein said elongated handle member has a handle grip member with an aperture therethrough for facilitating gripping and storage at the top.

5. The ice fishing hole strainer device of claim 1, wherein said handle member has a slotted bottom portion and wherein said slotted portion engages said top end of said cylindrical structure.

6. The ice fishing hole strainer device of claim 1, wherein said stop member has a plurality of peripheral tabs and wherein said cylindrical member bottom has a plurality of slots to receive said tabs, wherein said trap door has a beveled edge and wherein a plastic peripheral edge strip is attached to said top end of said cylindrical member.

7. An ice fishing hole strainer device comprising a cylindrical member having an open top and an open bottom, a cylindrical trap door member having a plurality of holes therethrough disposed at said open bottom, a hinge member connecting said trap door to said cylindrical member and an elongated handle member attached to said open top of said cylindrical member, said cylindrical trap door member having a beveled edge and being constructed and arranged to freely move and pivot within said cylindrical member as said device is lowered into an ice hole; said strainer device further having a generally circular stop member positioned within said cylinder member at said open bottom to cooperate with said cylindrical trap door member, and having a protective edge strip positioned on the open top of said cylindrical member and said stop member having a plurality of peripheral tabs and said open bottom of said cylindrical member having a plurality of slots to receive said peripheral tabs.

8. The strainer device of claim 7, wherein said elongated handle member has a member for facilitating storage at the top thereof.

9. The strainer device of claim 7, wherein said cylindrical member is formed of a galvanized steel or plastic composition.

10. The strainer device of claim 7, wherein said hinge member has a first connecting member, a second connecting member and an interconnecting pivot member wherein said first connecting member is secured to said trap door member and wherein said second connecting member is secured to said cylindrical member.

11. The strainer device of claim 10, wherein said second connecting member has an elongated slot for receiving said interconnecting pivot member.

12. The strainer device of claim 7, wherein said handle member has a slotted bottom portion and wherein said slotted portion engages said open top of said cylindrical member.

13. An ice fishing hole strainer device comprising a cylindrical member having an open top and an open bottom, a cylindrical trap door member disposed at said open bottom, a hinge member connecting said trap door to said cylindrical member and an elongated handle member attached to said open top of said cylindrical member, said trap door member further having a plurality of holes and a generally circular stop member having a periphery positioned within said cylindrical member at said open bottom to cooperate with said trap door member, said hinge member further having a first connecting member, a second connecting member and an interconnecting pivot member wherein said first connecting member is secured to said trap door member and wherein said second connecting member is secured to said cylindrical member, said second connecting member having an elongated slot for receiving said interconnecting pivot member, said first connecting member and said cylindrical trap door member freely move in both a vertical and rotational direction as said ice fishing hole strainer device is lowered into and lifted from an ice fishing hole.

14. The ice fishing hole strainer device of claim 13, wherein a protective edge strip is positioned on the upper edge of said cylindrical member.

15. The ice fishing hole strainer device of claim 13, wherein said cylindrical member is formed of a galvanized steel or plastic composition.

16. The ice fishing hole strainer device of claim 13, wherein said elongated handle member has a member for facilitating storage at the top thereof.

17. The ice fishing hole strainer device of claim 13, wherein said handle member has a slotted bottom portion and wherein said slotted portion engages said open top of said cylindrical member.

18. The ice fishing hole strainer device of claim 13, wherein said stop member has a plurality of peripheral tabs and wherein said cylindrical member bottom has a plurality of slots to receive said tabs, wherein said trap door has a beveled edge and wherein a plastic peripheral edge strip is attached to said top end of said cylindrical member.

* * * * *